United States Patent  
Herrmann et al.

(10) Patent No.: US 10,305,347 B2
(45) Date of Patent: May 28, 2019

(54) ELECTROMAGNETIC COMPATIBILITY OF A DRIVE ARRANGEMENT FOR AN ELECTRICALLY DRIVEN VEHICLE

(71) Applicant: Bayerische Motoren Werke Aktiengesellschaft, Munich (DE)

(72) Inventors: Hubert Herrmann, Haimhausen (DE); Martin Reuter, Munich (DE); Peter Streng, Emmering (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/851,218

(22) Filed: Dec. 21, 2017

(65) Prior Publication Data

US 2018/0123421 A1 May 3, 2018

Related U.S. Application Data

(63) Continuation of application No. PCT/EP2016/061532, filed on May 23, 2016.

(30) Foreign Application Priority Data

Jun. 24, 2015 (DE) .................. 10 2015 211 644

(51) Int. Cl.
*H02K 7/00* (2006.01)
*F16C 33/66* (2006.01)
(Continued)

(52) U.S. Cl.
CPC ........... *H02K 7/003* (2013.01); *C10M 147/00* (2013.01); *F16C 33/6633* (2013.01);
(Continued)

(58) Field of Classification Search
CPC .......... H02K 7/00; H02K 7/003; H02K 7/006; F16C 33/66; F16C 33/6633
(Continued)

(56) References Cited

U.S. PATENT DOCUMENTS 3,928,214 A * 12/1975 Naka .................. C10M 5/00
                                                    252/510
4,277,118 A * 7/1981 McCloskey ............. F16C 33/18
                                                    384/300

(Continued)

FOREIGN PATENT DOCUMENTS

DE    26 57 575 A1    6/1978
DE    35 11 755 A1    10/1985
(Continued)

OTHER PUBLICATIONS

JPO machine translation of JP 2014176176 A, all pages.*

(Continued)

*Primary Examiner* — Naishadh N Desai
(74) *Attorney, Agent, or Firm* — Crowell & Moring LLP

(57) ABSTRACT

A drive arrangement for an electrically driven vehicle includes an electric motor that is configured to accelerate the vehicle, the electric motor has a rotor, which is arranged inside a stator having stator windings and is arranged on a rotor shaft. The drive arrangement also includes a drive shaft coupled to a drive wheel of the vehicle, and a shaft coupling that transmits torque output by the rotor shaft such that said torque is conducted to the drive shaft, wherein the shaft coupling has a torque receiving element that receives the torque output by the electric motor, and a torque output element that is mechanically coupled to the torque receiving element and outputs the torque in a direction of the drive shaft. An electrically insulating grease is arranged between the torque receiving element and the torque output element.

18 Claims, 3 Drawing Sheets

(51) Int. Cl.
    *C10M 147/00*     (2006.01)
    *F16D 1/10*     (2006.01)
    *F16D 3/68*     (2006.01)

(52) U.S. Cl.
    CPC ............... *F16D 1/101* (2013.01); *F16D 3/68* (2013.01); *H02K 7/006* (2013.01); *F16D 2001/103* (2013.01); *F16D 2300/06* (2013.01)

(58) Field of Classification Search
    USPC ............ 310/83, 76, 78, 92, 93, 99, 100, 101
    See application file for complete search history.

(56) References Cited

U.S. PATENT DOCUMENTS

| | | | |
|---|---|---|---|
| 4,278,028 A | | 7/1981 | Eichinger et al. |
| 5,646,838 A | * | 7/1997 | Keidar ............... H01L 25/112 257/E25.025 |
| 6,323,161 B1 | | 11/2001 | Cha |
| 7,193,836 B2 | | 3/2007 | Oh et al. |
| 8,488,293 B2 | | 7/2013 | Baumann |
| 2009/0038866 A1 | * | 2/2009 | Abe ........................ B60K 1/02 180/65.7 |

FOREIGN PATENT DOCUMENTS

| | | |
|---|---|---|
| DE | 60 2004 011 867 T2 | 3/2009 |
| DE | 10 2010 056 008 A1 | 6/2012 |
| DE | 11 2010 004 938 T5 | 11/2012 |
| DE | 10 2013 200 356 A1 | 8/2013 |
| EP | 1 840 193 A2 | 10/2007 |
| JP | 2014-176176 A | 9/2014 |
| JP | 2014176176 A * | 9/2014 |

OTHER PUBLICATIONS

PCT/EP2016/061532, International Search Report dated Jul. 12, 2016 (Two (2) pages).

German Search Report issued in German counterpart application No. 10 2015 211 644.1 dated Apr. 29, 2016, with Statement of Relevancy (Nine (9) pages).

* cited by examiner

ELECTROMAGNETIC COMPATIBILITY OF A DRIVE ARRANGEMENT FOR AN ELECTRICALLY DRIVEN VEHICLE

CROSS REFERENCE TO RELATED APPLICATIONS

This application is a continuation of PCT International Application No. PCT/EP2016/061532, filed May 23, 2016, which claims priority under 35 U.S.C. § 119 from German Patent Application No. 10 2015 211 644.1, filed Jun. 24, 2015, the entire disclosures of which are herein expressly incorporated by reference.

BACKGROUND AND SUMMARY OF THE INVENTION

The invention relates to an improved drive arrangement for an electrically driven vehicle in which interference which is emitted by an electric motor via shafts for driving the motor vehicle is reduced.

Electric motors for driving a motor vehicle are known in the prior art, for example in the case of vehicles having a so-called hybrid drive, which has an internal combustion engine and an electric motor, and completely electrically driven vehicles, which are driven only by an electric motor. An electric motor typically comprises a stator with a plurality of stator windings. The rotor can have permanent magnets, electrically excited magnets or a cage.

The stator windings are usually driven by an inverter. The inverter does not generate an ideal signal profile but a signal profile having jumps and interference spikes. Such jumps and interference spikes cause so-called wave currents or wave voltages in the electric motor. These wave currents can be propagated through the gearbox to the drive shafts, from which interference fields are output. It goes without saying that such interference fields are undesired.

DE 11 2010 004 938 T5 discloses a retrofit kit for grounding a shaft, having a conductive ring element and a cylindrical spring with a diameter which is the same as that of the conductive ring element. The spring constant of the cylindrical spring is such that the spring keeps the conductive ring element within the housing in contact with the shaft and the housing.

DE 35 11 755 A1 discloses an arrangement for deflecting wave voltages, wherein on the shaft side of the electrodynamic machine, on which the bearings are isolated electrically with respect to ground, mass and foundation by insulating sections, a current path having a contact device with at least one sliding contact and a capacitance connected in series therewith is provided between the shaft and the machine mass or ground.

DE 60 2004 011 867 T2 discloses the reduction of wave voltages and wave currents by means of conductive bearing grease, insulation of the bearings and use of copper-phosphorus brushes and a Faraday shield. In addition, an annular frame in an annular channel having a plurality of electrically conductive threads can be used in order to reduce ionization in the presence of an electric field.

DE 10 2013 200 356 A1 discloses a bearing system for a wind turbine with an insulating ring for the electrical isolation of a bearing ring from a wind turbine element.

The teachings of the prior art are not sufficient to ensure the electromagnetic compatibility of a drive arrangement for an electrically driven vehicle.

The object of the invention is to devise a drive arrangement for an electrically driven vehicle which exhibits improved electromagnetic compatibility.

A drive arrangement for an electrically driven vehicle comprises an electric motor, which is designed to accelerate or decelerate the vehicle, wherein the electric motor has a rotor, which is arranged inside a stator having stator windings and is arranged on a rotor shaft. The drive arrangement further comprises a drive shaft, which is coupled to a drive wheel of the vehicle. The drive arrangement also comprises a shaft coupling, which transmits the torque output by the rotor shaft, such that said torque can be conducted to the drive shaft, wherein the shaft coupling has a torque receiving element, which receives the torque output by the electric motor, and a torque output element, which is mechanically coupled to the torque receiving element and outputs the torque in the direction of the drive shaft. An electrically insulating grease is arranged between the torque receiving element and the torque output element.

The effect of the electrically insulating grease is that the shaft voltage or the shaft current cannot propagate further via the shaft coupling and thus the electromagnetic compatibility of the drive arrangement is increased. The shaft currents and shaft voltages are not conducted into the gearbox and not into the drive shaft of the electrically driven vehicle.

It not necessary for the torque receiving element to be coupled directly to the rotor shaft. Nor is it necessary for the torque output element to be coupled directly to the drive shaft.

The torque receiving element and the torque output element can be connected to each other in a form-fitting manner. The insulating grease can be arranged on the form-fitting connection.

The torque receiving element and the torque output element can form a shaft-hub interface. The torque receiving element can be a toothed shaft and the torque output element can be a hub with a broached internal profile. As an alternative to this, the torque receiving element can be a hub with a broached internal profile and the torque output element can be a toothed shaft.

The electrically insulating grease can have particles of an electrically insulating solid. The electrically insulating grease can have polytetrafluoroethylene particles, polytetrafluoroethylene flakes or the like. Polytetrafluoroethylene is also known under the trade name Teflon. As a result of the addition of polytetrafluoroethylene as an additive to the grease, an insulating effect is achieved, since the polytetrafluoroethylene particles can be deposited on the torque receiving element and torque output element.

Preference is given to particles, flakes or additives which form an insulating film between and/or on the torque receiving element and the torque output element. The insulating film can, for example, be produced on account of the mechanical forces which act on the grease and the particles, the flakes or the additives.

A lubricating grease must be arranged on the torque receiving element and on the torque output element in order to prevent corrosion. As a result of adding the additive to the grease, both good corrosion prevention and good electrical insulation are achieved.

The electrically insulating grease arranged between the torque receiving element and the torque output element can have a contact resistance between the torque receiving element and the torque output element of at least 10 k$\Omega$, preferably of at least 100 k$\Omega$, most preferably of at least 1 M$\Omega$. With a contact resistance of about 1 M$\Omega$, the electromagnetic compatibility of the drive arrangement is improved by about the factor 10, which corresponds to damping of about 20 dB.

The torque receiving element can be formed integrally with the rotor shaft. For example, the rotor shaft can have a toothed shaft profile at one end or a hub profile with a broached internal profile. In this embodiment, the electrical isolation of the shaft currents or shaft voltages is carried out very close to the electric motor. The rotor shaft can be coupled to the drive shaft by a gearbox. The torque output element can be formed integrally with a gearbox shaft. The effect of this embodiment is that the drive arrangement is firstly compact and secondly the shaft currents or shaft voltages are isolated close to the electric motor.

Other objects, advantages and novel features of the present invention will become apparent from the following detailed description of one or more preferred embodiments when considered in conjunction with the accompanying drawings.

BRIEF DESCRIPTION OF THE DRAWINGS

The invention will now be described in more detailed form and non-restrictively by means of an embodiment with reference to the appended figures, in which.

DETAILED DESCRIPTION OF THE DRAWINGS

Figure 1:
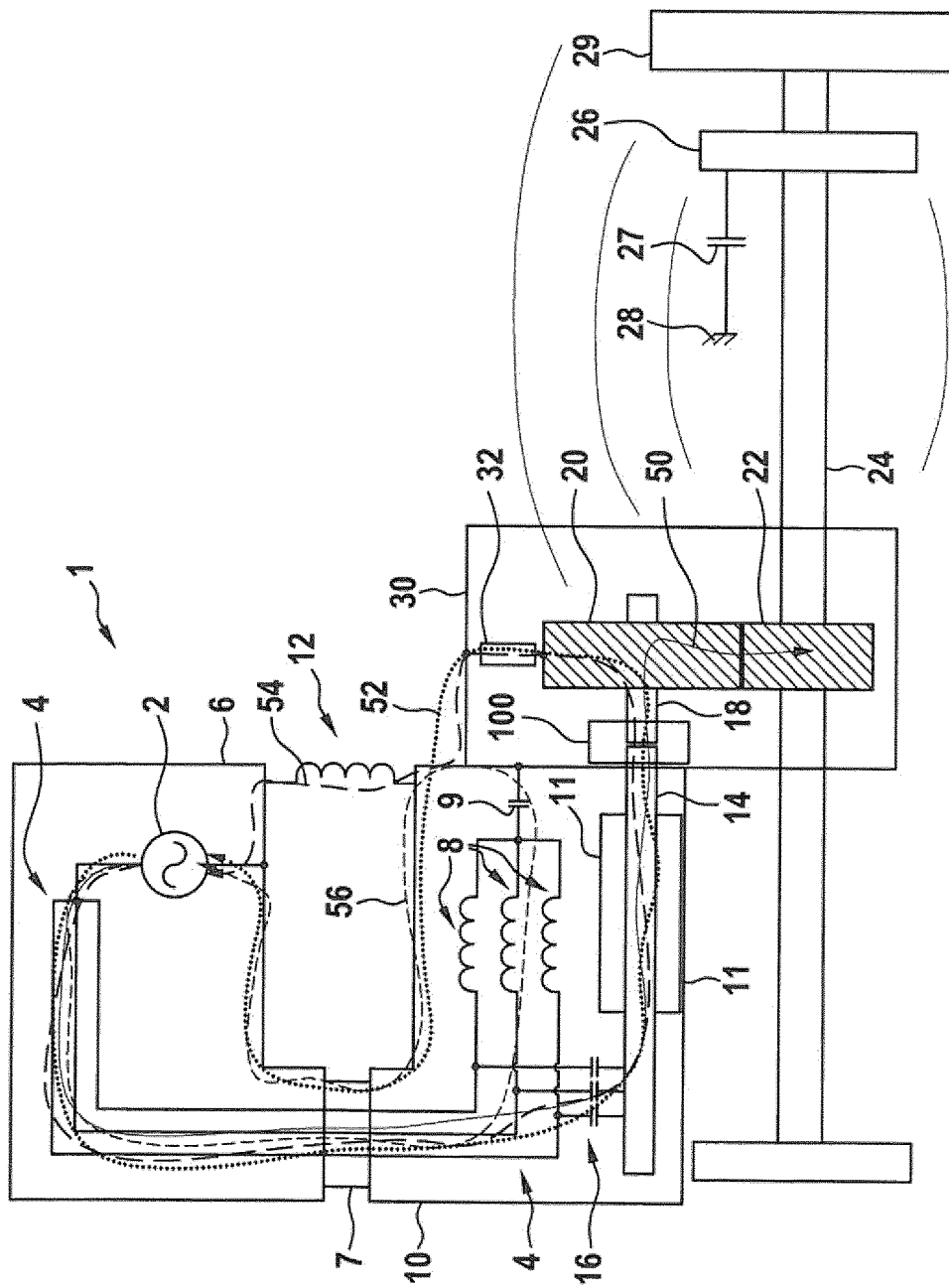
FIG. 1 shows an equivalent circuit diagram of a drive arrangement for driving a motor vehicle.

Reference is made to FIG. 1, which shows a schematic view of a drive arrangement 1 of an electrically driven vehicle, in which an electric equivalent circuit diagram for the electromagnetic compatibility and for the shaft voltages and shaft currents is also illustrated.

An inverter 2 is arranged in an inverter housing 6. The inverter 2 generates a three-phase alternating current from the DC voltage from a traction accumulator (not shown). The three-phase alternating current comprises harmonics and pulses (so-called ripples). The three-phase alternating current is conducted via a three-phase line 4 to an electric motor 10.

The electric motor 10 has three stator windings 8. The rotating magnetic field generated by the stator windings 8 has the effect that a force acts on magnets 11 on the rotor shaft 14, and in turn effects rotation of the rotor shaft 14. The rotor shaft is coupled via a shaft-hub interface 100 to the input shaft 18 of a gearbox 30 having a plurality of meshing gear wheels 20, 22, which transmit the torque of the rotor shaft 14 to a drive shaft 24. A brake disk 26 and a wheel 29 are arranged on the drive shaft 26.

In the following text, the electric equivalent circuit diagram will be described, to the extent that it relates to the electromagnetic compatibility of the drive arrangement 1. A ground strap 12 between the electric motor and the housing of the inverter 6 acts as a mass inductance LGND. The three-phase line 4 and/or the stator windings 8 have a first parasitic capacitance 16 with respect to the rotor shaft 14. The rotor windings 8 have a second parasitic capacitance 9 with respect to the housing of the electric motor 10. In addition, the brake disk 26 has a third parasitic capacitance 27 with respect to the bodywork 28, for example via the brake pads. The oil in the gearbox 32 produces a parasitic resistance 32.

In the following text, shaft currents or shaft voltages will be described by way of example, to the extent that they are important to the consideration of the electromagnetic compatibility of the drive arrangement 1. A first shaft current 50 flows from the inverter 2 via the three-phase line 4, the first parasitic capacitances 16, the rotor shaft 14, the input shaft 18 of the gearbox 30, via the gear wheels 20, 22 of the gearbox 30, to the drive shaft 24. As a result, a shaft voltage is applied to the drive shaft 24, which is an alternating voltage, so that the drive shaft acts as an antenna and emits an interference signal. The first shaft current 50 can flow via the brake disks and the third parasitic capacitance 27 to the bodywork 28.

A second parasitic shaft current 52 flows from the inverter 2 via the three-phase line 4, the first parasitic capacitances 16, the rotor shaft 14, the shaft-hub interface 100, the gearbox input shaft 18, at least one gear wheel 20, 22 and the parasitic gearbox oil resistance 32 to the housing of the gearbox 30, from where it flows back via the housing of the electric motor 10, past the EMC seal 7, via the housing 6 of the inverter to the inverter 2.

A third parasitic shaft current 54 flows from the inverter 2 via the three-phase line 4, the first parasitic capacitances 16, the rotor shaft 14, the shaft-hub interface 100, the input shaft 18 of the gearbox 30 and via the parasitic resistance 32 of the gearbox oil to the housing of the gearbox 30. From the housing of the gearbox 30, the third parasitic shaft current 54 flows to the housing of the electric motor 2 and via the ground strap 12, which forms a parasitic inductance, to the housing 6 of the inverter 2 and finally to the inverter 2.

A fourth parasitic shaft current 56 flows from the inverter 2 via the three-phase line 4, the stator windings 8 and the second parasitic capacitance 9 to the housing of the electric motor 10, from where the fourth parasitic shaft current flows past the EMC seal 7 to the housing 6 of the inverter 2 and finally to the inverter 2.

Figure 2A:
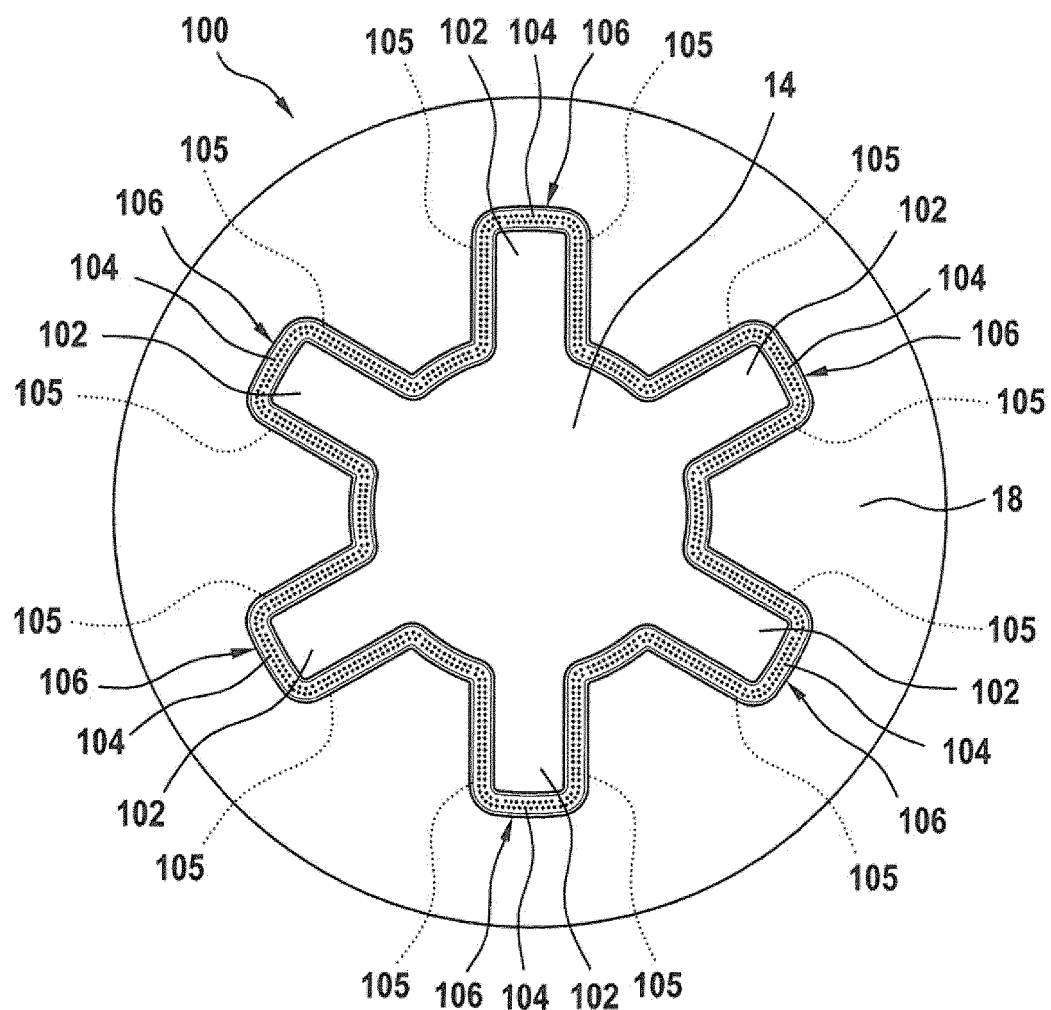
FIG. 2a shows a cross section through a shaft coupling.
Figure 2B:
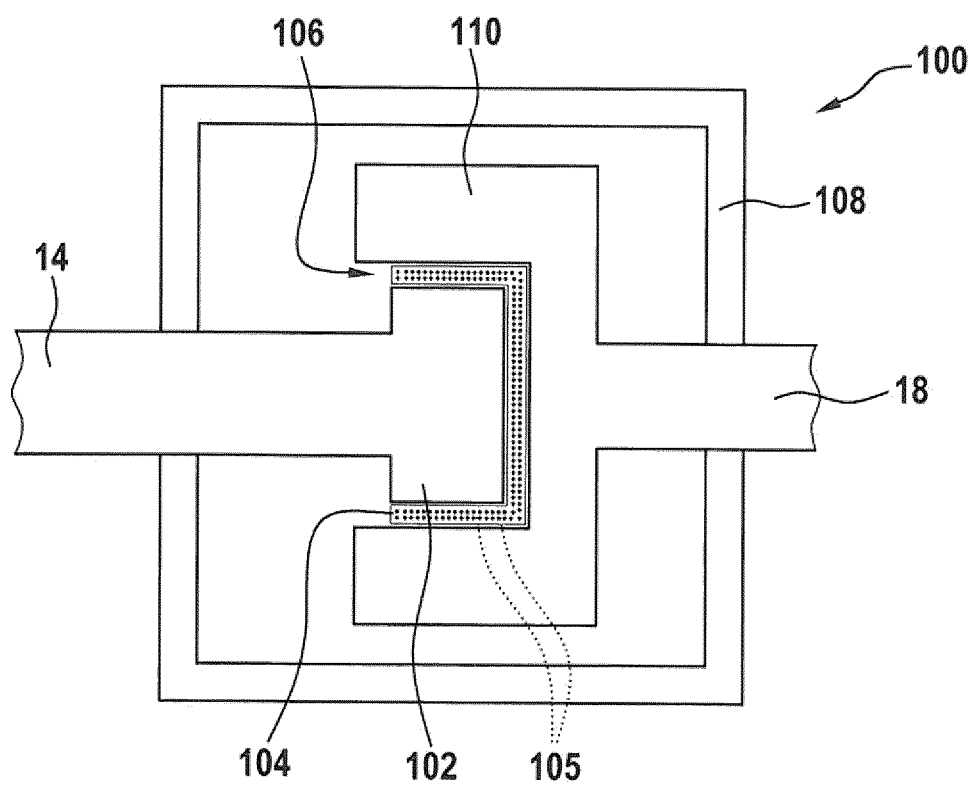
FIG. 2b shows a longitudinal section through a rotor shaft and a gearbox shaft in the area of the shaft coupling.

Reference will be made to FIGS. 2a and 2b, wherein FIG. 2a shows a cross section through the shaft-hub interface 100 and FIG. 2b shows a longitudinal section through the shaft-hub interface 100. The rotor shaft 14 comprises a plurality of teeth 102 extending radially. The input shaft 18 of the gearbox 30 comprises a hub 110 having a plurality of recesses 106, which extend in the radial direction. The teeth 102 of the rotor shaft 14 are arranged within the recesses 106 of the hub 110, which is fitted to the input shaft 18 of the gearbox 30. The shaft-hub interface 100, which forms a shaft coupling, also comprises a housing 108, which can be produced from plastic.

Between the teeth 102 and the recesses 106 there is a film of grease 104. This film of grease is necessary in order to prevent corrosion of the teeth 102 and of the recesses 104.

The inventors of the present invention have recognized that the first shaft current 50, the second shaft current 52 and the third shaft current 54 can be attenuated considerably if an electrically insulating grease 104 is used in the shaft-hub interface 100. The insulating grease 104 can, for example, have polytetrafluoroethylene particles and/or polytetrafluoroethylene flakes. Polytetrafluoroethylene is also known as Teflon. The inventors of the present invention have found that by using the insulating grease 104, the shaft currents can be reduced by the factor 10, which corresponds to an attenuation of about 20 dB at, for example, 25 MHz.

The polytetrafluoroethylene particles and/or the polytetrafluoroethylene flakes are added to the insulating grease 104 as an additive. They form an insulating polytetrafluoroethylene layer, which is produced, for example, at the transition from the teeth 102 to the recesses 104. As opposed to this, a conventional grease permits a conductive contact point on surface roughnesses of a tooth 102 and/or a recess 106.

The insulating grease 104 creates a shaft-hub interface 100 with a contact resistance of at least 10 kΩ, preferably at least 100 kΩ, most preferably of at least 1 MΩ. As a result of this contact resistance, shaft currents can be reduced by the factor 10 and attenuated by 20 dB.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A drive arrangement for an electrically driven vehicle, comprising:
    an electric motor, configured to accelerate the vehicle, wherein the electric motor has a rotor, which is arranged inside a stator having stator windings and is arranged on a rotor shaft;
    a drive shaft coupled to a drive wheel of the vehicle; and
    a shaft coupling that transmits torque output by the rotor shaft such that said torque is conducted to the drive shaft, wherein the shaft coupling includes: a torque receiving element that receives the torque output by the electric motor, and a torque output element that is mechanically coupled to the torque receiving element so as to receive the torque from the torque receiving element and output the torque to the drive shaft,
    wherein the mechanical coupling is a direct mechanical coupling, except for an electrically insulating grease is arranged between the torque receiving element and the torque output element.

2. The drive arrangement as claimed in claim 1, wherein the torque receiving element and the torque output element are connected to each other in a form-fitting manner.

3. The drive arrangement as claimed in claim 1, wherein the torque receiving element and the torque output element form a shaft-hub interface.

4. The drive arrangement as claimed in claim 2, wherein the torque receiving element and the torque output element form a shaft-hub interface.

5. The drive arrangement as claimed in claim 1, wherein one of the torque receiving element and torque output element is a toothed shaft element, and wherein the other of the torque receiving element and torque output element is a hub with a broached internal profile.

6. The drive arrangement as claimed in claim 2, wherein one of the torque receiving element and torque output element is a toothed shaft element, and wherein the other of the torque receiving element and torque output element is a hub with a broached internal profile.

7. The drive arrangement as claimed in claim 3, wherein one of the torque receiving element and torque output element is a toothed shaft element, and wherein the other of the torque receiving element and torque output element is a hub with a broached internal profile.

8. The drive arrangement as claimed in claim 1, wherein the electrically insulating grease has particles of an insulating solid.

9. The drive arrangement as claimed in claim 5, wherein the insulating grease has at least one of polytetrafluoroethylene particles and polytetrafluoroethylene flakes.

10. The drive arrangement as claimed in claim 1, wherein the electrically insulating grease arranged between the torque receiving element and the torque output element has a contact resistance between the torque receiving element and the torque output element of at least 10 kΩ.

11. The drive arrangement as claimed in claim 3, wherein the electrically insulating grease arranged between the torque receiving element and the torque output element has a contact resistance between the torque receiving element and the torque output element of at least 10 kΩ.

12. The drive arrangement as claimed in claim 5, wherein the electrically insulating grease arranged between the torque receiving element and the torque output element has a contact resistance between the torque receiving element and the torque output element of at least 10 kΩ.

13. The drive arrangement as claimed in claim 1, wherein the torque receiving element is formed integrally with the rotor shaft.

14. The drive arrangement as claimed in claim 3, wherein the torque receiving element is formed integrally with the rotor shaft.

15. The drive arrangement as claimed in claim 5, wherein the torque receiving element is formed integrally with the rotor shaft.

16. The drive arrangement as claimed in claim 10, wherein the torque receiving element is formed integrally with the rotor shaft.

17. The drive arrangement as claimed in claim 1, further comprising a gearbox coupled to the rotor shaft and the drive shaft.

18. The drive arrangement as claimed in claim 17, wherein the torque output element is formed integrally with a gearbox shaft.

* * * * *